July 7, 1936.  E. J. SORTORE ET AL  2,046,977
INDICATOR DIAL OPERATING MECHANISM
Filed April 11, 1930  4 Sheets-Sheet 1
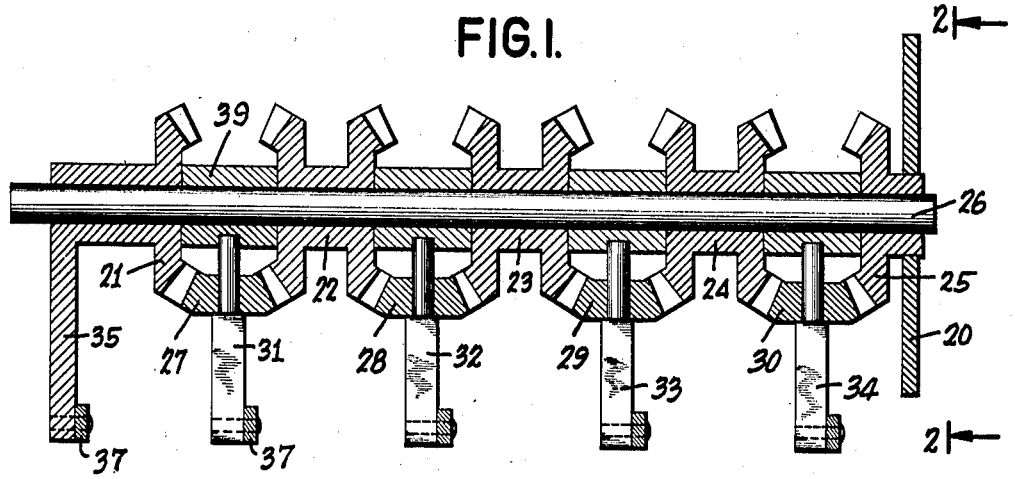
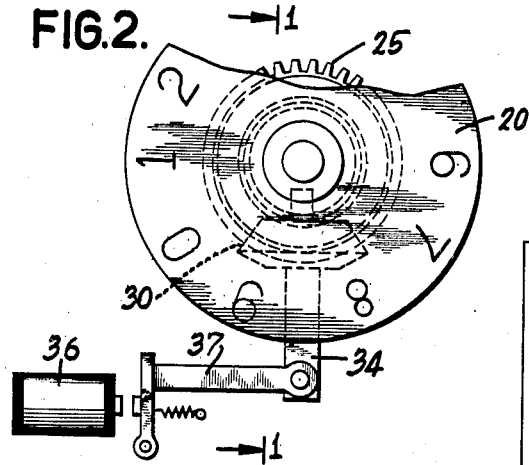
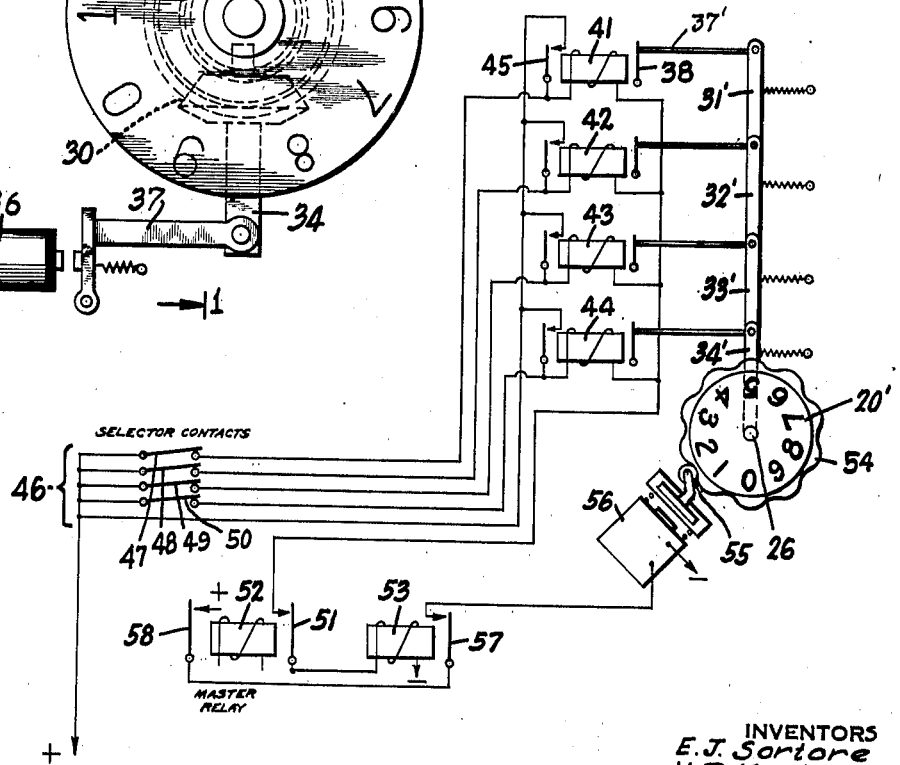
INVENTORS
E. J. Sortore
V. R. Kimball
BY
Eugene G. Brown
ATTORNEY

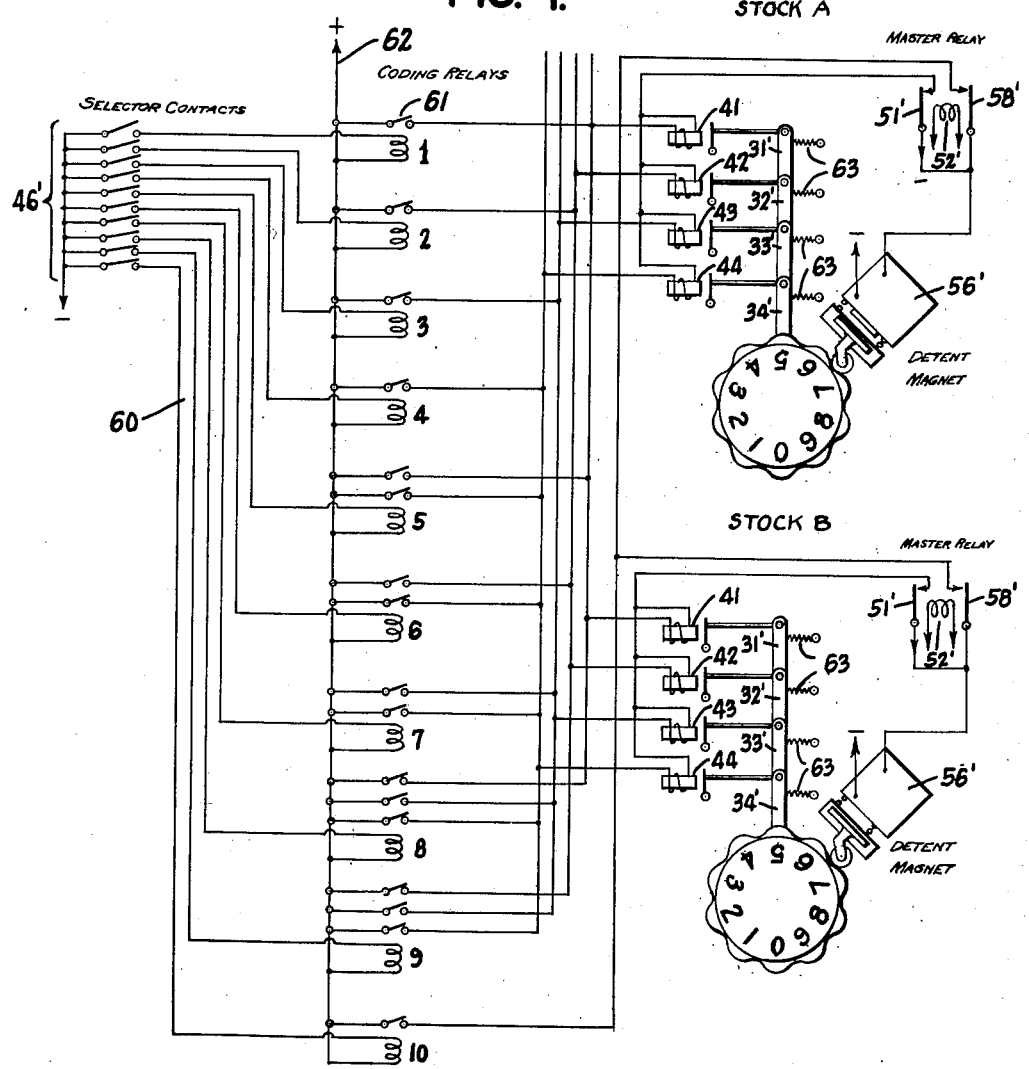

July 7, 1936.  E. J. SORTORE ET AL  2,046,977

INDICATOR DIAL OPERATING MECHANISM

Filed April 11, 1930  4 Sheets-Sheet 3

INVENTORS
E. J. Sortore
V. R. Kimball
BY
Eugene C. Brown
ATTORNEY

July 7, 1936.  E. J. SORTORE ET AL  2,046,977

INDICATOR DIAL OPERATING MECHANISM

Filed April 11, 1930  4 Sheets-Sheet 4

INVENTORS
E. J. Sortore
V. R. Kimball
BY
Eugene C. Brown
ATTORNEY

Patented July 7, 1936

2,046,977

UNITED STATES PATENT OFFICE 2,046,977

INDICATOR DIAL OPERATING MECHANISM

Emerson J. Sortore, Metuchen, and Vernon R. Kimball, Palisades Park, N. J., assignors to The Western Union Telegraph Company, New York, N. Y., a corporation of New York Application April 11, 1930, Serial No. 443,596

4 Claims. (Cl. 177—337)

This invention relates to an aggregate motion device for positioning indicator dials, tapes, type wheels and similar character carrying elements in a plurality of positions. It is particularly applicable to the operation of stock quotation indicators, but is useful in other connections.

In automatic stock quotation systems, two general types of indicating boards have been proposed. In one type of board the various quotations are posted on the board either by remote or local control by rotating a group of dials or other character carrying elements behind apertures or windows in the board panel to set up the combination of figures corresponding to the quotation for direct reading. In the other system, the quotations are printed upon a paper tape which subsequently moves across the face of the board to bring the printed quotation into view.

The present invention is applicable either to the positioning of the character carrying element for direct reading or to the rotation of a type wheel or series of type wheels into printing position for recording the quotation in printed form on a tape.

One of the objects of the present invention is to provide an operating mechanism for setting a character carrying element in a relatively large number of positions in response to a relatively small number of selective conditions.

Another object is to provide an indicator or recording device in which each setting of the character carrying elements is independent of previous settings thereof, and which is not subject to accumulative errors.

Another object is to produce an indicator operating mechanism in which the character carrying element is rotated by a continuous movement as distinguished from a step by step movement, and in which the indicator is locked in each set position.

Another object is to provide an aggregate motion device for a quotation board indicating unit, which is compact in construction and which will occupy a relatively small area of the board while enabling relatively large characters to be employed.

A still further object is to enable a relatively large movement of the character carrying element to be obtained for each change in the positions of the characters.

Another object is to produce an improved aggregate motion device of general application, which is rugged and dependable, and which may be readily operated in response to telegraph signals.

Other objects and advantages will appear from the following description.

The invention will be understood from a detailed description of the accompanying drawings wherein:

Figure 1 is a sectional view of the indicator operating mechanism employing a train of bevel gears and pinions constructed in accordance with one embodiment of the invention;

Figure 2 is an elevation viewed from the right of Figure 1;

Figure 3 is a circuit diagram showing one manner of controlling the operation of the indicator unit;

Figure 4 is a circuit diagram showing a modified arrangement for operating the indicator unit;

Figure 5:
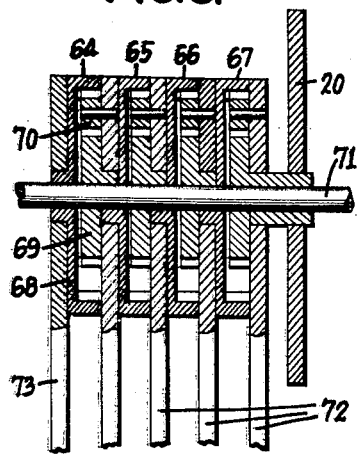
Figure 5 is a vertical sectional view of a modified construction of the indicator unit employing a planetary gear train.
Figure 6:
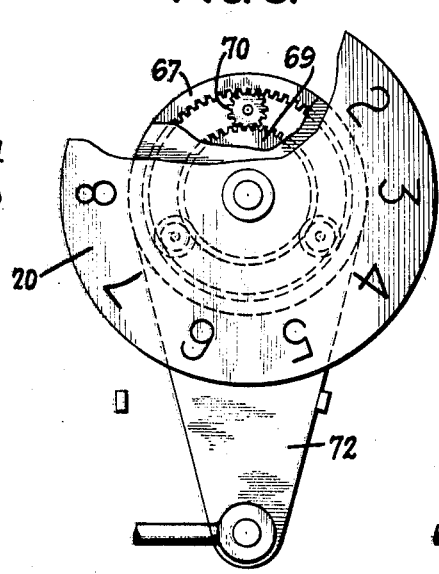
Figure 6 is an elevation viewed from the right of Figure 5.
Figure 7:
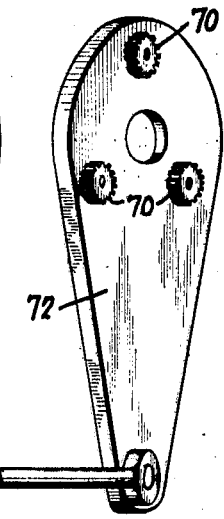
Figure 7 is a perspective view of one of the impelling devices for the indicator shown in Figure 5.

Referring first to Figures 1 and 2, we have shown an indicator dial 20 having suitable characters thereon, as for instance, the numerals one to nine and zero. The dial 20 is rotated through a train of beveled gears and pinions arranged so that the cumulative motion of the various units of the gear train may be utilized to determine the extent of rotation of the dial 20. The gear train comprises five beveled gears 21, 22, 23, 24 and 25, mounted upon a shaft 26, and meshing with four intermediate pinions or impelling gears 27, 28, 29 and 30, mounted upon shafts 31, 32, 33 and 34, respectively. The pinion shafts are secured to sleeves 39 mounted upon the shaft 26 between the beveled gears so as to permit the pinion shafts to have angular movement about the gear shaft 26 within a restricted range. The dial 20 is mounted directly on the last beveled gear 25 of the train, for rotation therewith. The pinion shafts extend a substantial distance beyond the pinions and serve as impelling levers for moving the pinions about the shaft 26. A lever 35 is also provided for rotating the beveled gear 21.

With the arrangement shown, when any one of the levers 31 to 35 is given an angular movement about the shaft 26, the remaining pinion shafts being held stationary, this movement will be transmitted through the gear train to the dial 20 to rotate the same an amount depending upon the angular movement of the pinion shaft. If any two levers are simultaneously operated, it is evident that the movement imparted by one will supplement that of the other, and that the angular rotation imparted to the dial 20 by the simultaneous or successive action, will equal the sum of the movements due to them when working singly, and the same is true whatever the number of levers or impelled devices simultaneously operated. Therefore, by giving to each of the levers a different range of angular movement, as for instance, as represented by the terms of the series 1, 2, 3, 4 and 5, and operating the levers in different combinations, a total of fifteen different angular movements of the disk can be obtained. If the levers are given a range of movement in accordance with the terms of the series 1, 2, 4, 8, and 16, a total of thirty-two different angular movements may be imparted to the indicator dial by operating the levers singly or in twos, threes, fours or altogether. Thus, with five impelling levers, the disk may be separately positioned for each letter of the alphabet with six additional settings. When the numerals one to nine and zero only are involved, the number of impelling devices may be reduced to four.

The levers 31 to 35 may be operated through any suitable mechanism and for convenience we prefer to employ electromagnetic means. In Figure 2 we have shown the impelling levers operated by a magnet 36 through a link 37 secured to the armature of the magnet. The desired range of movement of the impelling levers may be obtained by adjusting the range of throw of the magnet armature or by varying the leverage in proportion to the angular movement desired.

Figure 3 illustrates a circuit arrangement for operating the indicators to a number of positions with a total of four selective conditions. The indicator 20' is shown having four impelling levers 31', 32', 33' and 34' of decreasing lengths so as to impart angular movement to the pinions about the shaft 26 in accordance with the terms of the series 1, 2, 3 and 4. Each lever is connected by a link 37' to the armature 38 of one of the four operating magnets 41, 42, 43 and 44. Each operating magnet also has a locking contact 45.

A receiving selector 46, having four contacts 47, 48, 49 and 50, controls the operation of the operating magnets. The receiving selector may be of any suitable type capable of having the contacts thereof selectively closed in response to telegraph code signals, as for instance, the type shown in copending application of Wheeler and Sortore, Serial #422,148, filed January 20, 1930, and entitled "Stock selecting and indicating system".

The return circuit for each of the operating magnets is completed through the contact 51 of a master relay 52, and the winding of a detent control magnet 53. One master relay is provided common to all of the indicator units of each stock, of which in the usual quotation system there are twenty indicator units. The master relays may be operated by means of any desired selecting system in response to telegraph code signals, as for instance, by the system shown in copending application of Wheeler and Sortore, Serial #422,150, filed January 20, 1930, and entitled "Selecting system".

The indicator 20' has a detent wheel 54 engaged by a detent roller 55, controlled by a magnet 56, for locking the dial in each set position. One detent control relay 53 is provided for each detent magnet, the operating circuit for the detent magnet being completed through the tongue 57 of the detent control relay and the tongue 58 of the master relay.

The operation of the indicator unit is as follows. Assuming that it is desired to post the numeral 1 of a stock under the control of the master relay 52, the master relay is first energized through an appropriate selecting system to close its contacts thus preparing the return circuit for each of the operating magnets 41 to 44, and also preparing a circuit to the detent magnet; which circuit is open at the contact of the detent control relay 53. The selector contact 47, which controls unit motion of the indicator dial, is next closed, completing the circuit for the magnet 41 and for the relay 53. Upon operation of these devices, the detent magnet circuit is completed and the detent withdrawn from the locking position, and at the same time the impelling lever 31' is moved to impart unit movement to the indicator dial through the gear train. The locking contact 45 of the relay 41 is also closed at this time, completing a locking circuit for the magnet, which is maintained as long as the master relay is energized. Upon de-energization of the master relay, the detent magnet releases the detent 55, thereby locking the dial in its set position and at the same time interrupting the locking circuit for operating magnet 41. However, since the indicator dial 20' is locked in its operated position, the impelling lever 31' cannot return to its retracted or normal position but remains in its operated position. Consequently upon the next selection if magnet 41 again enters into the combination the lever 31 is retained in its operated position by the magnet during the time of releasing of the indicator dial through energization of detent magnet 56. If magnet 41 does not enter into the succeeding combination lever 31' is restored to its normal position upon the releasing of the detent magnet by the coil spring attached to the lever 31'. It will be evident therefore that upon each successive operation of the indicator dial only those impelling levers not entering into the new combination are restored to normal position. For instance if levers 31' and 32' were involved in one combination and in the succeeding combination levers 31', 32' and 34' are involved, levers 31' and 32' retain their last operated position and lever 34' only is moved. This eliminates needless motion of the impelling levers and planetary gear elements associated therewith. The dial 20' operates either in a forward or rearward direction from the last position thereof depending upon whether a higher or lower digit is to be displayed.

If it is desired to move the dial to bring the numeral 5 into indicating position, contacts 47 and 50 of the selector are closed in succession, thereby operating and locking up the magnets 41 and 44, the former of which imparts one unit of motion and the latter four units of motion, to the indicator dial. Similarly, any desired movement up to ten may be obtained by various combinations of selector contacts.

In Figure 4 we have shown a circuit arrangement in which any one or more of the operating magnets 41 to 44 may be operated by closing a single selector contact. The selector 46' is provided with a contact for each position of the indicator dial and these contacts are connected by a group of conductors 60 to the windings of a group 61 of coding relays having one or more contacts for completing the circuit to one or more of the operating magnets depending upon the extent of motion which it is desired to transmit to the indicator dial. The circuits for the operating magnets 41 to 44 extend from a source of positive potential 62 through the contacts of the coding relays, windings of the operating magnets and contact 51' of the master relay 52' and then to the detent magnet 56' in series therewith. The coding relays are designated by the numerals 1 to 10 corresponding to the character on the indicator dial controlled thereby. The tenth coding relay has its contact connected directly to the detent magnet through the contact 58' of the master relay whereby the posting of a 0 character is effected merely by the release of the detent magnet, whereupon the dial is returned to its 0 position by the retractile springs 63 acting on the impelling levers 31' to 34'.

The selector contacts and the coding relays are common to all stocks and in Figure 4 I have shown the connections for one indicator of each of two different stocks or items.

Figure 5 illustrates a modified form of indicator unit employing four sets of planetary gears 64, 65, 66 and 67, each set consisting of an internal spur gear 68, an external spur gear 69 and intermediate impelling pinions 70 of which we have shown three in this embodiment. The gears 68 and 69 are mounted upon a shaft 71 and the pinions 70 are mounted upon an impelling member 72 mounted concentrically on the shaft 71 so as to have angular movement around the shaft within a restricted range. The hubs of the external spur gear 69 of one set and the internal spur gear 68 of the next set are provided with clutch faces whereby the rotation of one gear is transmitted to the other. The dial 20 is mounted upon the hub of the external spur gear 69 of the planetary set 67. An impelling lever 73 is also provided for the internal spur gear 68 of planetary set 64. The impelling levers are given angular movement about the shaft 71 in accordance with the terms of the series 1, 2, 3, 4 and 5, or of the series 1, 2, 4, 8 and 16 so as to permit a number of combinations of movements to be imparted to the character carrying dial.

Figure 8:
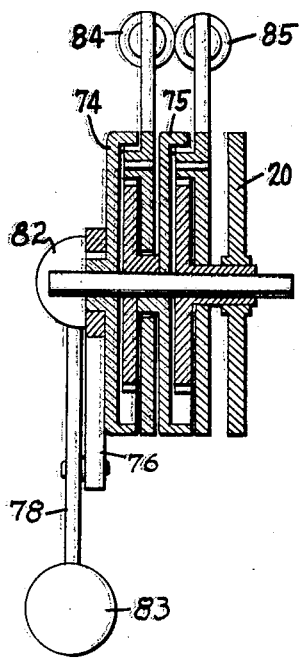
Figure 8 is a vertical sectional view of a still further modified form of indicator unit employing a combination of planetary gears and floating levers.
Figure 9:
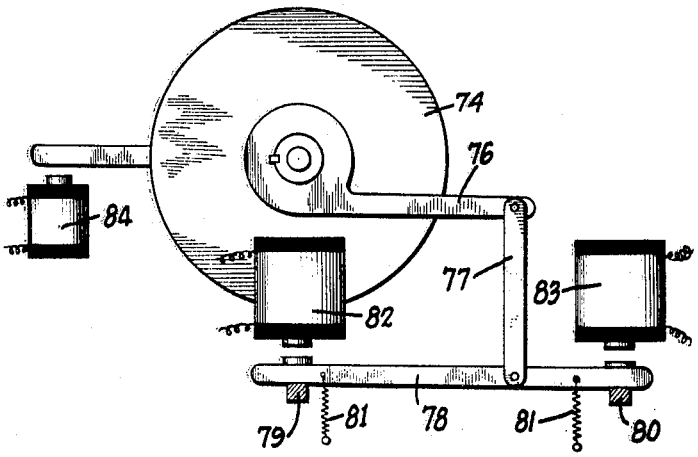
Figure 9 is a rear elevation of the indicator shown in Figure 8.
Figure 10:
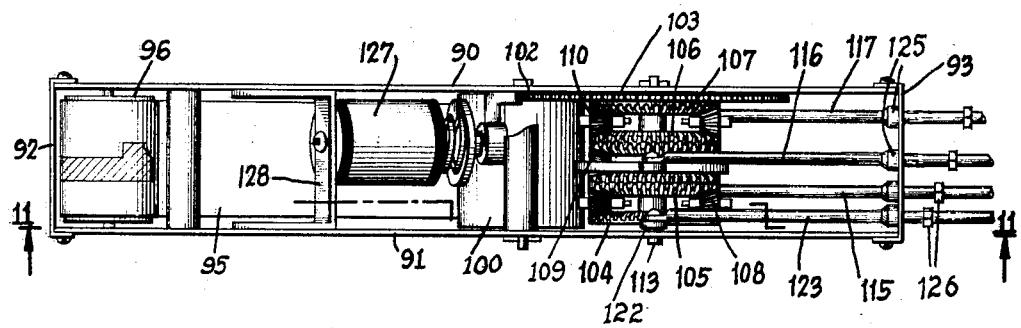
Figure 10 is a plan view of a still further embodiment utilizing a character carrying tape.
Figure 11:
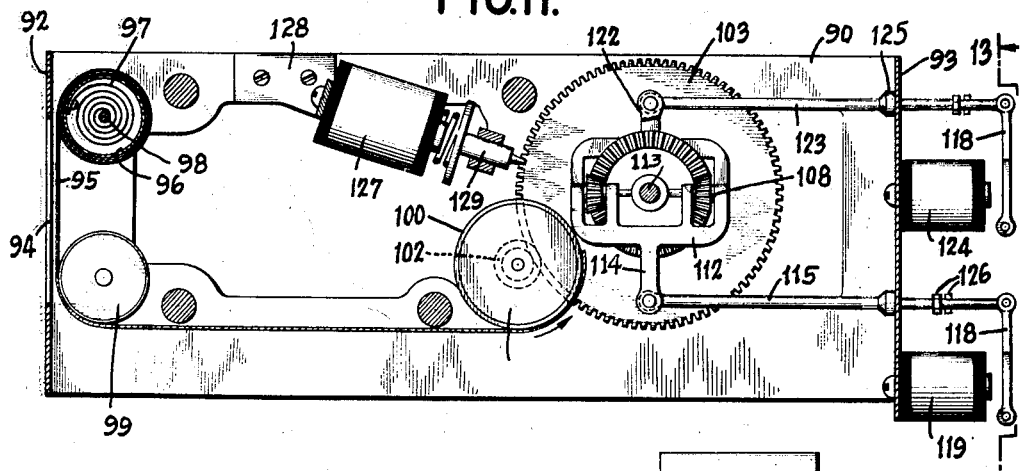
Figure 11 is a side elevation of the indicator of Figure 10.
Figure 13:
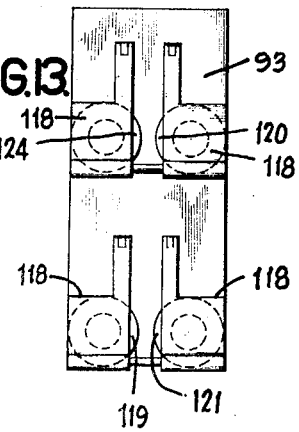
Figure 13 is a rear view of the indicator of Figure 10.
Figure 12:
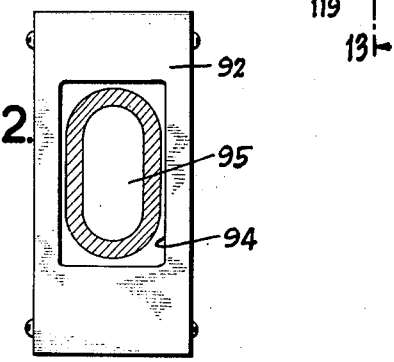
Figure 12 is a front view of the indicator of Figure 10.

Figure 8 shows a combination of planetary gears and floating levers for operating the indicator dial by their accumulative motions. Two sets of planetary gears 74 and 75 are provided similar to those of Figure 5, and the impelling lever 76 of the external spur gear of planetary set 74 is connected by a link 77 to a floating lever 78 normally held against stationary abutments 79 and 80 by springs 81 and adapted to be operated away from the abutment by magnets 82 and 83. As shown in Figure 9 the link 77 is connected to the lever 78 at a point distant from the abutment 80 approximately one-third of the length of the lever. With this arrangement, the operation of magnet 83, causes the lever 78 to rock about the abutment 79 so as to rotate the impelling lever 76 a distance of two units. The magnet 82 similarly controls the movement of the lever one unit and the impelling levers of the planetary sets 74 and 75 may be given a range of movement corresponding to three and four units respectively, through the operating magnets 84 and 85. Thus, by operating the magnets 82, 83, 84 and 85 in various combinations any desired movement of the dial up to fifteen units or settings may be obtained.

In Figures 10 to 13 we have shown a practical embodiment of the invention utilizing in place of the character carrying dial, a tape having characters thereon which is arranged to be moved past the window in the quotation board panel. This embodiment comprises two side plates 90 and 91 and two end plates 92 and 93. The end plate 92 forms the front of the unit and is provided with a window 94 behind which the tape 95 is disposed so as to expose one character to view. The tape is wound upon a roller 96 provided with a spiral spring 97 connected to the interior of the roller and to the fixed shaft 98 so as to tend to maintain the tape wound upon the roller. The tape passes downwardly past the window 92 around an idler roller 99 and thence to a roller 100 to which one end of the tape is secured and upon which the tape is wound by the accumulative motion device, against the action of the spring 97. The roller 100 has a gear 102 meshing with a large gear 103, operated by a train of bevel gears in accordance with the accumulative motion of a number of impelling levers. This gear train is similar to that shown in Figure 1 but of more compact form. It comprises four bevel driven gears 104, 105, 106 and 107, with three sets of intermediate impelling pinions 108, 109 and 110. Each set of pinions comprises two diametrically opposite pinions carried by a frame 112 mounted upon the shaft 113 of the gear train for angular movement thereon and having an impelling lever or arm 114 which is connected by a link 115, 116 or 117, to the armature 118 of operating magnets 119, 120 and 121. The bevel gear 104 is also provided with an impelling lever 122 connected by a link 123 to the armature 118 of an operating magnet 124. The links pass through the rear wall 93 of the indicator casing and are provided with stop members 125 and 126 engaging the opposite sides of the rear wall 93 to limit the movement of the links in each direction. The links are arranged so as to have an extent of movement in accordance with the terms of the series 1, 2, 3 and 4, so as to enable various combinations of movements to be imparted to the tape through the roller 100.

A detent magnet 127 mounted on a bracket 128 between the side plates 90 and 91 serves to withdraw detent 129 from normal engagement with the teeth of the gear 103.

The gear ratio of the gears 102 and 103 is such that the tape 95 is moved a distance of one character thereon for each unit movement of the gear 103 so that the various characters on the tape may be selectively exposed through the window 94 by actuation of the operating magnets in different combinations. The window 94 may be made of substantially the full area of the front wall 92 of the casing and the characters of a commensurate size so that the indicator unit will occupy an area of the front of the board only slightly greater than the area occupied by the character being exposed.

While the aggregate motion device has been described with particular reference to an indicator unit it is not limited thereto but may be employed for the operation of type wheels or for making other selections, and therefore, we do not desire to be limited to the exact details shown or to the specific circuit arrangements disclosed.

What we claim is:

1. In a device of the class described, a character carrying member, an epicyclic gear train having a plurality of sun and intermediate planetary gear elements, said planetary gear elements each having a normal position, means tending to return each of said planetary elements to its normal position when not being operated upon, mechanical connections between said character carrying member and said gear train for transmitting to the character carrying member through the succeeding gear elements the accumulated motion of the individual planetary elements, magnetic means for each planetary gear element for supplying the sole power for operating said planetary gear elements and selective means for simultaneously energizing said magnetic means in combinations to produce a selective movement of said character carrying member.

2. An indicator unit comprising a rotary member, an epicyclic gear train having a plurality of sun and intermediate planetary gears, a reciprocating impelling device connected to each of said planetary gear elements for imparting planetary movement to each planetary gear, magnetic means for operating said impelling devices in combination, stop elements for limiting the movement of said impelling devices, means for imparting the movement of said planetary gear elements through the gear train to said rotatable member to move the same in one direction, means tending to move said rotary member in the opposite direction, and a character carrying member positioned by the combined action of said impelling devices and said last means.

3. An indicator unit comprising an epicyclic gear train having a plurality of sun and intermediate planetary gear elements, each of said planetary gear elements having an initial position of rest, magnetic operating means for each planetary gear element for separately imparting limited planetary movement from said position of rest to each of said elements, means to transmit said movement through the succeeding elements of the gear train to one element thereof, a character carrying member connected to said last element for movement in one direction thereby and means for applying a force tending to move said character carrying element in the opposite direction, said movement acting through said gear train to restore each of the planetary gear elements to said position of rest when not being acted upon by said first means, magnetic means for locking said character carrying member in each of a plurality of positions and means for concurrently operating said magnetically locking means and said magnetically operating means.

4. In a device of the class described, a character carrying member, an epicyclic gear train having a plurality of sun and intermediate gear elements, each of said planetary gear elements having a normal and an operated position, means for operating said planetary gear elements in combinations to their normal or operated positions, means to impart the individual planetary movement of said planetary elements either away from or towards said normal position through the succeeding elements of the gear train to said character carrying member to actuate the same either in a forward or rearward direction from its preceding position and means for restoring to normal position from the preceding combination only those planetary gear elements which do not enter into the succeeding combination.

EMERSON J. SORTORE.
VERNON R. KIMBALL.